US009049483B2

(12) United States Patent
Mahan

(10) Patent No.: US 9,049,483 B2
(45) Date of Patent: *Jun. 2, 2015

(54) APPARATUS, SYSTEMS AND METHODS FOR PARENTAL CONTROL SYNCHRONIZATION WITH MOBILE MEDIA DEVICES

(71) Applicant: EchoStar Technologies L.L.C., Englewood, CO (US)

(72) Inventor: William Sean Mahan, Sandy Springs, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,746

(22) Filed: Jan. 17, 2014

(65) Prior Publication Data

US 2014/0133830 A1 May 15, 2014

Related U.S. Application Data

(63) Continuation of application No. 13/095,467, filed on Apr. 27, 2011, now Pat. No. 8,635,708.

(51) Int. Cl.
| | |
|---|---|
| G06F 7/04 | (2006.01) |
| H04N 21/45 | (2011.01) |
| H04N 21/414 | (2011.01) |
| H04N 21/436 | (2011.01) |
| H04N 21/454 | (2011.01) |
| H04N 21/475 | (2011.01) |

(52) U.S. Cl.
CPC ..... *H04N 21/4532* (2013.01); *H04N 21/41407* (2013.01); *H04N 21/436* (2013.01); *H04N 21/454* (2013.01); *H04N 21/4751* (2013.01)

(58) Field of Classification Search
CPC .......... H04N 21/41407; H04N 21/436; H04N 21/4532; H04N 21/454; H04N 21/4751; H04N 21/25841; H04N 21/25891; H04N 21/812; H04N 21/4104; H04N 21/4126; H04N 21/439; H04L 63/0281; H04L 63/166; H04L 67/02; H04L 67/04; H04L 67/1095; H04L 67/12; H04L 67/2842; H04L 69/329; H04L 67/325
USPC .............. 726/28; 709/203, 208, 211; 725/110
See application file for complete search history.

(56) References Cited

U.S. PATENT DOCUMENTS

| | | | |
|---|---|---|---|
| 7,869,792 B1 | 1/2011 | Zhou et al. | |
| 8,359,351 B2 * | 1/2013 | Istvan et al. | 709/203 |
| 2003/0005135 A1 | 1/2003 | Inoue et al. | |
| 2008/0168515 A1 * | 7/2008 | Benson et al. | 725/110 |

FOREIGN PATENT DOCUMENTS

WO 2009042373 A1 4/2009

* cited by examiner

*Primary Examiner* — Thanhnga B Truong
(74) *Attorney, Agent, or Firm* — Lowe Graham Jones PLLC

(57) ABSTRACT

Systems and methods are operable to enforce parental controls at a mobile media device. An exemplary embodiment establishes a communication link between the mobile media device and a local media device, receives parental control setting information from the local media device at the mobile media device, receives at least one media content event and rating information associated with the received media content event at the mobile media device, compares at the mobile media device the rating information associated with the received at least one media content event with the parental control setting information received from the local media device, and prevents presentation of the at least one media content event by the mobile media device if the rating information associated with the received media content event violates the parental control setting information.

20 Claims, 2 Drawing Sheets

US 9,049,483 B2

APPARATUS, SYSTEMS AND METHODS FOR PARENTAL CONTROL SYNCHRONIZATION WITH MOBILE MEDIA DEVICES

PRIORITY CLAIM

This patent application is a Continuation of U.S. Non-Provisional patent application Ser. No. 13/095,467, filed Apr. 27, 2011, published as U.S. Publication No. 2012/0278899, entitled "APPARATUS, SYSTEMS AND METHODS FOR PARENTAL CONTROL SYNCHRONIZATION WITH MOBILE MEDIA DEVICES," and issued as U.S. Pat. No. 8,635,708 on Jan. 21, 2014, the content of which is herein incorporated by reference in its entirety.

BACKGROUND

Media devices, such as a set top box, a stereo, a television, a computer system, a game system, or the like, are configured to receive media content. The media content may be received at the media device from a variety of sources. For example, the media device may be communicatively coupled to a media content provider system, such as a satellite system, a cable system, a fiber optic system, an over the air (OTA) system, and/or the Internet. The received media content is communicated to a presentation device having a display and/or speakers. The video portion of the media content is presented on the display and the audio portion of the media content is reproduced as sounds by the speakers.

In some instances, the media device, referred to hereinafter as a local media device, may be communicatively coupled to a mobile media device. The mobile media device may be further configured to receive media content from the local media device. Accordingly, media content events may then be presented by the mobile media device. Such exemplary mobile media devices include cellular phones, smart phones, electronic tablets, personal computers, laptop computers, netbooks, or the like.

Some media content events may not be appropriate for young adults or children. Many devices and schemes are in place to enable parental control rights that restrict access to such inappropriate, and thus restricted, media content events by the young adults or children using the media device. Such parental control rights devices and schemes rely on information that is associated with the media content event, such as the well known motion picture rating system and/or television program rating systems that classify media content events with regard to suitability for audiences in terms of issues such as sex, violence, substance abuse, profanity, or other types of mature content. Information pertaining to the rating, or certification, for a particular media content event may be included in the metadata portion of the media content event.

The detectable rating information may be used to limit access to inappropriate restricted media content under various parental control schemes. When the restricted media content event is processed by the local media device, the media content event rating information is compared to parental control settings stored at the local media device. If the media content event rating information violates the parental control setting information, presentation of the restricted media content event may be halted, terminated or otherwise disrupted.

The mobile media devices may also have parental control devices and schemes. However, when an inappropriate or otherwise restricted media content event is communicated from the local media device to the mobile media device, the parental control settings in effect at the local media device may not be known and/or enforced at the mobile media device. For example, the parental control settings of the transmitting local media device may be more restrictive that the parental control settings of the receiving mobile media device. Accordingly, the mobile media device is not able to restrict access to the media content event in accordance with the parental control setting of the transmitting local media device.

Accordingly, there is a need in the arts to manage access to restricted media content at a mobile media device that is configured to receive media content from a local media device.

SUMMARY

Systems and methods of enforcing parental controls at a mobile media device are disclosed. An exemplary embodiment establishes a communication link between the mobile media device and a local media device, receives parental control setting information from the local media device at the mobile media device, receives at least one media content event and rating information associated with the received media content event at the mobile media device, compares at the mobile media device the rating information associated with the received at least one media content event with the parental control setting information received from the local media device, and prevents presentation of the at least one media content event by the mobile media device if the rating information associated with the received media content event violates the parental control setting information.

BRIEF DESCRIPTION OF THE DRAWINGS

Preferred and alternative embodiments are described in detail below with reference to the following drawings.

DETAILED DESCRIPTION

Figure 1:
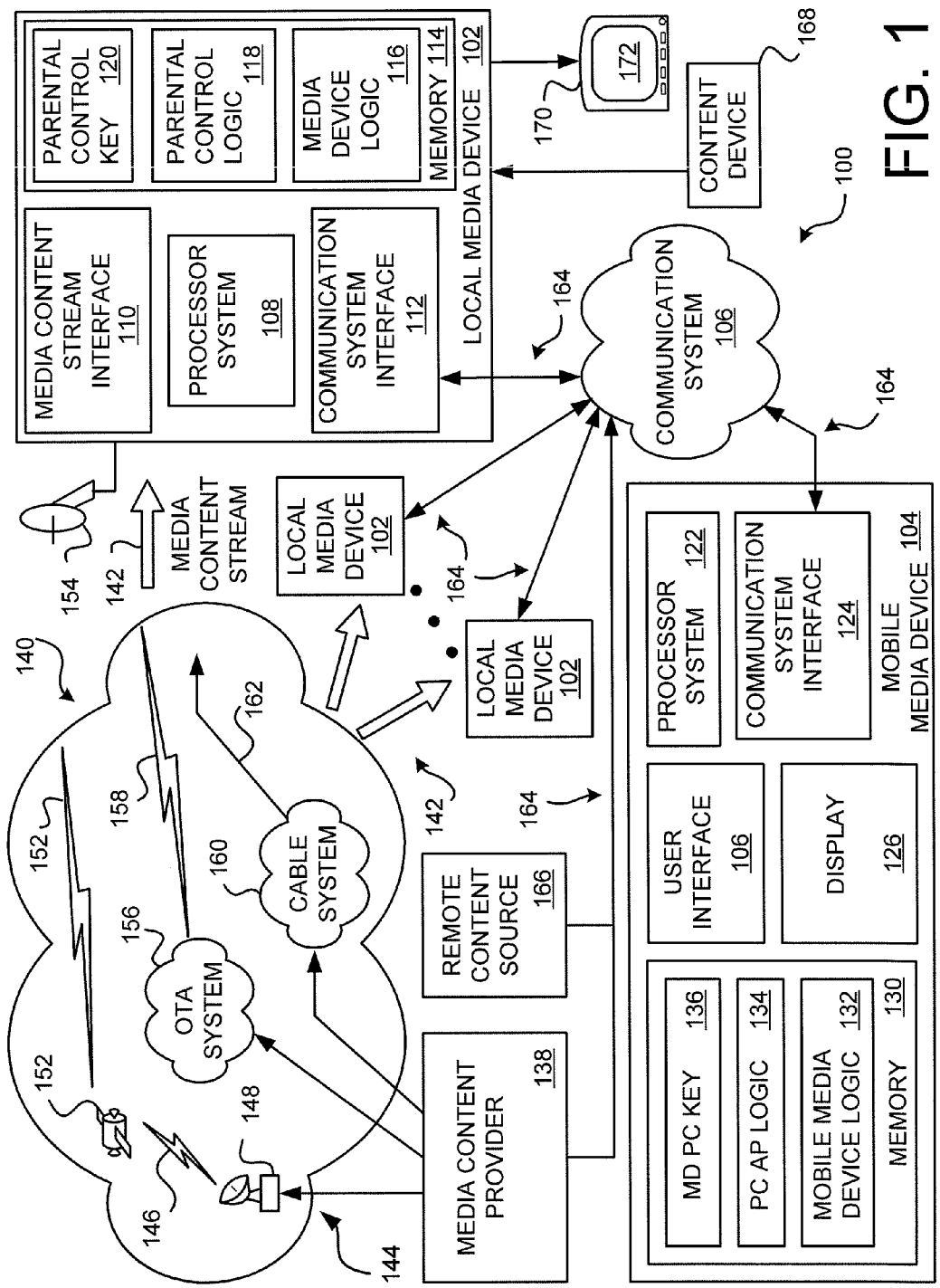
FIG. 1 is a block diagram of an embodiment of a parental control setting communication system implemented in a local media device and a mobile media device.

FIG. 1 is a block diagram of an embodiment of a parental control setting communication system 100 implemented in a local media device 102 and a mobile media device 104. The local media device 102 is configured to communicate a media content event to the mobile media device 104 via a communication system 106. An exemplary local media device 102 includes, but is not limited to, a set top box (STB), a stereo, a surround-sound receiver, a radio, a television (TV), a digital video disc (DVD) player, a digital video recorder (DVR), a game playing device, or a personal computer (PC) that is configured to process media content events. An exemplary mobile media device 104 includes, but is not limited to, a cellular phone, a smart phone, an electronic tablet, a personal computer, a laptop computer, a netbook, or the like.

Embodiments of the parental control setting communication system 100 are configured to provide the parental control setting information that is in effect at the local media device 102 to the mobile media device 104. Accordingly, when the media content event received from the local media device 102 is accessed and/or is presented by the mobile media device 104, the parental control settings in effect at the local media device 102 may be enforced at the mobile media device 104.

The exemplary local media device 102 comprises a processor system 108, a media content stream interface 110, a communication system interface 112, and a memory 114. The memory 114 comprises portions for storing the media device logic 116, parental control logic 118, and a parental control key 120. In some embodiments, the media device logic 116 and the parental control logic 118 may be integrated together, and/or may be integrated with other logic. Other local media devices 102 may include some, or may omit some, of the above-described media processing components. Further, additional components not described herein may be included in alternative embodiments.

The exemplary mobile media device 104 comprises a processor system 122, a communication system interface 124, a display 126, a user interface 128, and a memory 130. The memory 130 comprises portions for storing the mobile media device logic 132, parental control (PC) application (AP) logic 134, and a media device (MD) parental control (PC) key 136. In some embodiments, the mobile media device logic 132 and the media device parental control logic 136 may be integrated together, and/or may be integrated with other logic. Other local media devices 102 may include some, or may omit some, of the above-described media processing components. Further, additional components not described herein may be included in alternative embodiments.

To facilitate disclosure of an exemplary embodiment of the parental control setting communication system 100, delivery of media content events to the local media device 102 are briefly described. A media content provider 138 receives media content, in the form of a plurality of media content events, from a plurality of local program providers or other content providers. The provided media content events may include, but are not limited to, a television program, a newscast, a broadcast sports event, a movie, or the like. The media content is typically provided in the form of a video stream and a synchronized audio stream. The media content provider 138 processes the received media content streams as necessary to prepare them for transmission to a plurality of local media devices 102. For example, commercials or the like may be incorporated with a particular media content event. Alternatively, or additionally, the media content may be associated with identifiers, such as channel number and/or station call signs. The processed media content is aggregated and is broadcast over a broadcast system 140 that is received as a media content stream 142 at the local media device 102.

A variety of types of communication systems may be used for the broadcast system 140 to communicate the media content stream 142 to the local media devices 102. The broadcast system 140 may employ a satellite system 144 wherein an uplink signal 146 is communicated from a ground antenna 148 up to one or more satellites 150. Each of the exemplary satellites 150 broadcast a wireless satellite signal 152 down to a receiver antenna 154 that is coupled to the local media device 102. The media content stream interface 110 receives the media content stream 142 from the receiver antenna 154.

Alternatively, or additionally, the broadcast system 140 may employ an over the air (OTA) system 156 wherein a wireless signal 158 is communicated using a wireless signal 158 that is received by the receiver antenna 154. The media content stream interface 110 then receives the media content stream 142 from the receiver antenna 154.

Alternatively, or additionally, the broadcast system 140 may employ a cable system 160 wherein a wire-based signal is communicated using a suitable cable 162 or the like that is coupled to the media content stream interface 110. Non-limiting examples of the cable 162 include a fiber optic cable, a coaxial cable, and telephone line The media content stream 142 may also be received by the local media device 102 in other manners. In an exemplary embodiment, the media content provider 138 is communicatively coupled to the local media device 102 via the exemplary communication system 106. The media content stream 142 may then be received at the communication system interface 112 via a communication link 164 that establishes connectivity of the local media device 102 to the media content provider 138.

As another non-limiting example, a remote content source 166, such as an Internet site or the like, may provide the media content stream 142 to the local media device 102 over the communication system 106 and via the established communication links 164. Alternatively, or additionally, the local media device 102 may be communicatively coupled to an external content device 168. Non-limiting examples of an external content device include, but are not limited to, a portable memory medium, a digital video disc player, a video cassette recorder, or the like. Alternatively, or additionally, received media content events may be saved onto a memory medium (not shown) residing within the local media device 102.

Regardless of the source of a particular media content event, a user of the local media device 102 may choose to configure the local media device 102 to apply one or more parental control settings to a received media content event. Rating information associated with the received media content event is also communicated to local media device 102. If the rating information associated with the received media content event does not violate the parental control setting information, the media content event is communicated to a media content presentation device 170, such as the exemplary television, for presentation thereon. For example, the video portion of a media content event, such as a movie, may be displayed on the display 172 of the media content presentation device 170.

If parental control settings are active, the local media device 102 will use the parental control logic 118, when executed by the exemplary processor system 108, to compare current parental control setting information with the rating of the media content event. If the media content event rating information exceeds one or more of the parental control settings, the local media device 102 will operate to prevent presentation of the restricted media content event. Any suitable parental control enforcement technique may be used, such as, but not limited to, disrupting communication of the restricted media content event to the media presentation device 170, superimposing interference type information over the restricted media content event so that it is not discernable when presented by the media presentation device 170, scrambling or encrypting the restricted media content event, turning off or otherwise disabling operation of the local media device 102 and/or the media presentation device 170, or the like.

Prior to enforcing the parental control settings against a particular media content event, the local media device 102 presents an access challenge to the user. The access challenge may comprise presentation of a suitable graphical user interface that presents the access challenge. An access challenge answer is required that corresponds to the stored parental control key 120. If the user's access challenge answer is correct, then presentation of the media content even is enabled.

The parental control key 120, known to the user, has been predefined by the user and stored in the memory 114. The parental control key 120 is the correct access challenge answer to the presented access challenge. Other individuals who are not authorized to be viewing that particular media content event do not know the parental control key 120. Examples of the parental control key 120 includes, but is not limited to, a password, an answer to a particular question, a biometric identifier, a PIN number, or the like.

To illustrate operation of an exemplary parental control system, an exemplary parental control key 120 may correspond to the password "ABC" which has been predefined and stored in the memory 114. Parental control setting information will have also been predefined prior to the attempt to access and/or present the media content event, such as prohibiting presentation of media content events that have an adult rating (such as an X rating, a R rating, and a PG rating). The rating information associated with the media content event is compared with the parental control setting information currently in effect at the local media device 102. If the media content event has an adult rating (X, R, or PG in this example), and thus violates the current parental control setting information, the access challenge is presented to the user. In an exemplary embodiment, the access challenge is presented as a graphical user interface, menu, or the like on the display 172 of the media presentation device 170. The user then has the opportunity to respond to the presented access challenge by providing an answer to the access challenge, referred to herein as the access challenge response. If the user's access challenge response to the access challenge is the correct access challenge answer "ABC" (which corresponds to the predefined the password "ABC" stored in memory 114), then the local media device 102 may permit presentation of the media content event. On the other hand, if the user is unable to correctly reply to the presented access challenge, then the local media device 102 will operate to prohibit presentation of the restricted media content event.

In some embodiments, access to particular "channels" that provide inappropriate media content streams 142 may be denied or controlled by the various embodiments. For example, an adult channel may present inappropriate content that is identified as an inappropriate channel in the parental control setting information. Accordingly, the mobile media device 104 would not allow access to the media content stream 142 associated with the restricted adult channel, at least in the absence of a correct access challenge answer to a presented access challenge.

In some situations, the mobile media device 104 may establish a communication link 164 to the local media device 102, via the communication system 106. The exemplary communication system 106 is illustrated as a generic communication system. In one embodiment, the communication system 106 comprises the Internet. Accordingly, the communication system interface 124 is a modem or other type of Internet communication device. Alternatively, the communication system 106 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In such embodiments, the communication system interface 124 is configured to establish a communication link or the like with the communication system 106 on an as-needed basis, and is configured to communicate over the particular type of communication system 106 that it is coupled to. The mobile media device 104 may then receive the media content stream 142, or an individual media content event, from the local media device 102.

However, a variety of situations may occur wherein a legacy mobile media device may not enforce the parental control settings in force at a legacy local media device. For example, the legacy mobile media device may not have a parental control device or scheme. Or, the current parental control setting information in effect at the legacy local media device is not communicated to the legacy mobile media device. Embodiments of the parental control setting communication system 100 may be used to reconfigure the local media device 102 and the mobile media device 104 to synchronize parental control setting information with each other. Accordingly, current parental control setting information of the local media device 102 that is intended to be applied to the communicated media content stream 142 and/or is applied to the particular media content event is enforced at the mobile media device 104.

In an exemplary embodiment, the parental control setting information and the parental control key 120 are communicated from the local media device 102 to the mobile media device 104 each time the communication link 164 is established between the local media device 102 and the mobile media device 104. This process is generically referred to herein as parental control setting synchronization. Thus, when the local media device 102 receives the media content stream 142 and/or a particular media content event from the local media device 102, the mobile media device 104 compares the rating information associated with the received media content stream 142 and/or a particular media content event with the parental control setting information received from the local media device 102 that is currently in effect at the mobile media device 104. Accordingly, the current parental control settings may be enforced by the local media device 102.

If the rating information associated with the received media content event violates the parental control setting information, the mobile media device 104 may enforce the parental control settings, and thus prevent presentation of the media content stream 142 and/or a particular media content event, in a variety of manners. An exemplary embodiment of the mobile media device 104 may end communication of the restricted media content stream 142 and/or the restricted media content event. Alternatively, or additionally, the mobile media device 104 may disable its display 172 so that the restricted media content stream 142 and/or the restricted media content event is not presented on the display 172. Alternatively, or additionally, the mobile media device 104 may scramble or otherwise interfere with the restricted media content event so that it is not discernable when presented on the display 172, stored in its memory 130 or another memory medium, or is communicated to another uncontrolled media device (not shown). Some embodiments may operate so as to prevent storage of the restricted media content stream 142 and/or the restricted media content event on its memory 130 or on another memory medium. Additionally, or alternatively, some embodiments of the mobile media device 104 may operate so that the restricted media content stream 142 and/or the restricted media content event are not communicated out from the mobile media device 104 to other uncontrolled media devices.

In another embodiment, the parental control setting information and the parental control key 120 are communicated from the local media device 102 to the mobile media device 104 concurrently with the communication of the media content stream 142 and/or the media content event. The parental control setting information and the parental control key 120 may be separately transmitted to the mobile media device 104 at the start of the communication, and/or may be communicated periodically during the communication of the media content stream 142 and/or the particular media content event. In some embodiments, the parental control setting information and the parental control key 120 may be embedded into the communicated media content stream 142 and/or the particular media content event. Accordingly, if the current parental control setting information at the local media device 102 is revised, the revised parental control setting information is received by the mobile media device 104.

An illustrative example is provided to describe operation of an exemplary mobile media device 104. When the mobile media device 104 establishes the communication link 164 to the local media device 102, the parental control setting synchronization is initiated. In an exemplary embodiment, the mobile media device 104 ascertains the identity of the local media device 102. If the identified local media device 102 is confirmed to have enforceable parental controls that should be applied to the received media content stream 142 and/or the particular media content event, then the mobile media device 104 requests the current parental control setting information. The local media device 102 communicates the current parental control setting information and the parental control key 120 to the mobile media device 104.

Alternatively, or additionally, when the mobile media device 104 establishes the communication link 164 to the local media device 102, the local media device 102 ascertains the identity of the mobile media device 104. If the mobile media device 104 is authorized to receive the media content stream 142 and/or a particular media content event, the local media device 102 communicates the current parental control setting information and the parental control key 120 to the mobile media device 104. Additionally, or alternatively, the parental control setting information may be communicated to the mobile media device 104 if an authorized user changes the parental control settings at the local media device 102. In some embodiments, the local media device 102 communicates the current parental control setting information and the parental control key 120 to the mobile media device 104 each time a new media content event is communicated to the mobile media device 104. Some embodiments may periodically communicate the parental control setting information to the mobile media device 104.

The mobile media device 104 stores the received parental control setting information into its memory 130. The parental control key 120 is also saved by the mobile media device 104 as the media device (MD) parental control (PC) key 136. In an exemplary embodiment, once the parental control synchronization process has been completed, the media content stream 142 and/or the particular media content event is communicated from the local media device 102 to the mobile media device 104. In the various embodiments, the stored parental control setting information remains in effect after the communication link 164 between the mobile media device and the local media device is ended.

The rating information associated with the received media content stream 142 and/or the received media content event is compared with the parental control setting information that was received from the local media device 102 by the processor system 122 executing the parental control application logic 134. In some embodiments, access is absolutely denied to any media content stream 142 and/or the particular media content event that is restricted. That is, the violating restricted media content stream 142 and/or the particular media content event is not presentable by the mobile media device 104. In such embodiments, an access challenge is not offered by the mobile media device 104 to its respective user.

Alternatively, if the media content stream 142 and/or the particular media content event has an adult rating (X, R, or PG in this example), and thus violates the previously defined parental control setting information, an access challenge may be presented to the user of the mobile media device 104. In an exemplary embodiment, the access challenge is presented as a graphical user interface, menu, or the like on the display 126 of the mobile media device 104. The user then has the opportunity to respond to the presented access challenge by providing the correct access challenge answer. If the user replies to the access challenge with an the correct access challenge response (which corresponds to the media device parental control key 136 stored in memory 130). If the user responds with an access challenge response that corresponds to the parental control key 120, then the mobile media device 104 may permit presentation of the media content stream 142 and/or the particular media content event. Presentation of the media content stream 142 and/or the particular media content event is effected by the processor system 122 executing the mobile media device logic 132. On the other hand, if the user is unable to correctly reply to the presented access challenge wherein the access challenge response does not correspond to the parental control key 120, then the mobile media device 104 will operate to prohibit presentation of the restricted media content stream 142 and/or the restricted media content event.

Alternative embodiments of the parental control setting communication system 100 may restrict access to and/or presentation of a media content stream 142 and/or the particular media content event that is received from other sources based upon the parental control setting information received from a master local media device 102. In some situations, the mobile media device 104 may receive a restricted media content stream 142 and/or a particular restricted media content event from the media content provider 138, the remote content source 166, the content device 168, and/or one of the other local media devices 102. Parental control setting information might not be communicated with the received restricted media content stream 142 and/or a particular restricted media content event. Further, the mobile media device 104 would not be able to perform a parental control setting synchronization process with the media content provider 138, the remote content source 166, or the content device 168. Also, it is possible that the mobile media device 104 would not perform the parental control setting synchronization with the other local media devices 102 since those local media devices 102 may not recognize the mobile media device 104 and/or may not even have a parental control device and scheme. And, in the event that the mobile media device 104 does perform the parental control setting synchronization with one of the other local media devices 102, the received parental control setting information may not correspond to the intended parental control setting information currently in effect at the master local media device 102.

For example, the mobile media device 104 may be in the possession of a child, and the parental control settings may have been initially predefined by the parents at the local media device 102. In an exemplary embodiment, once the mobile media device 104 has downloaded the parental control setting information from the master local media device 102, all media content streams 142 and/or the particular media content events may be managed in accordance with the received parental control setting information and the received parental control key 120. That is, even if the child operates the mobile media device 104 to establish a communication link 164 to the remote content source 166, to the media content provider 106, and/or to another local media device 102, so the child does not able to freely access a restricted media content stream 142 and/or a restricted media content event. Further, the child cannot freely access a restricted media content event from the content device 168.

Figure 2:
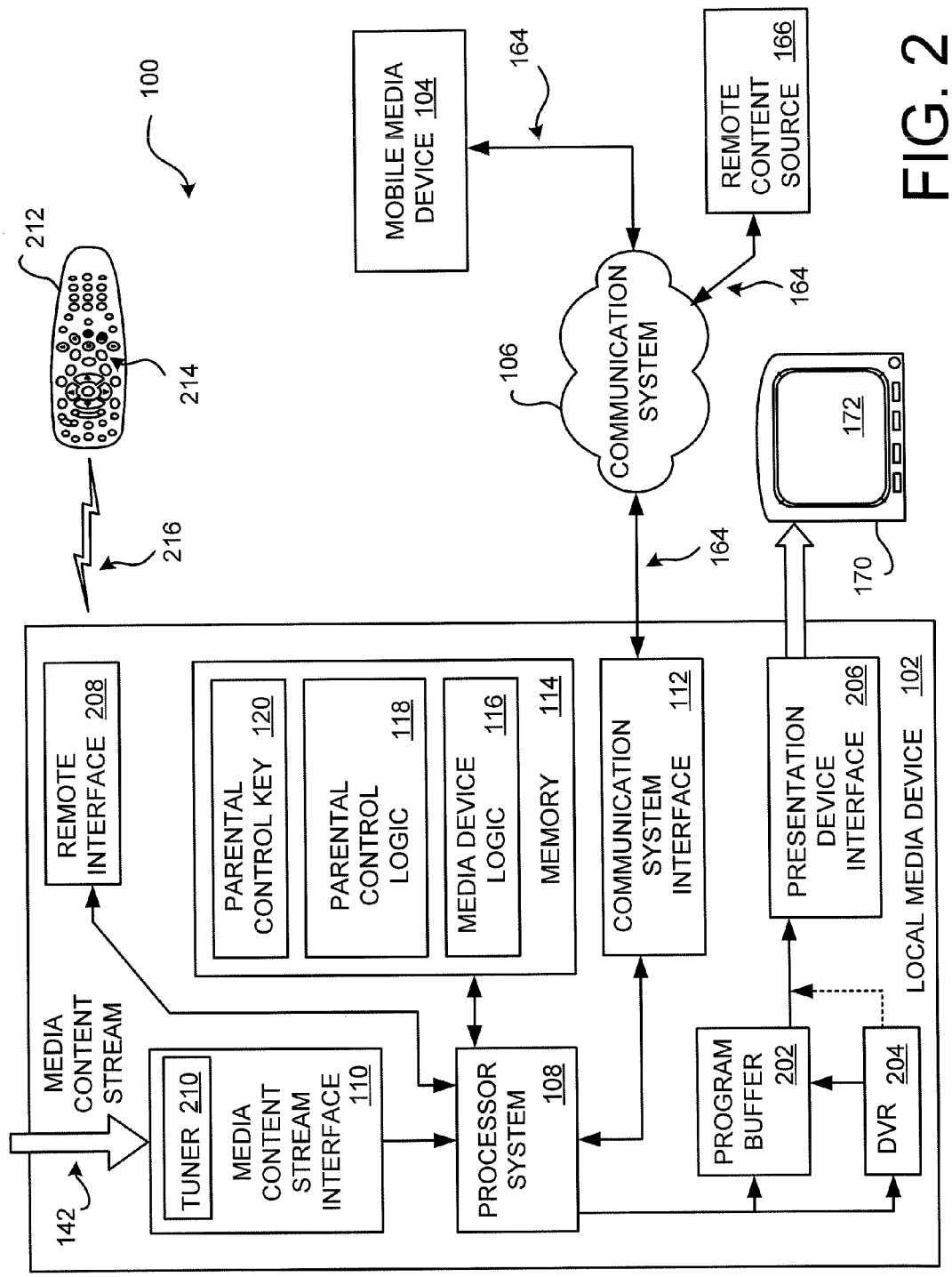
FIG. 2 is a block diagram of an exemplary embodiment of a local media device.

FIG. 2 is a block diagram of an exemplary embodiment of a local media device 102. The non-limiting exemplary local media device 102 comprises the media content stream interface 110, the processor system 108, the memory 114, a program buffer 202, an optional digital video recorder (DVR) 204, a presentation device interface 206, and a remote interface 208. Other media devices may include some, or may omit some, of the above-described media processing components. Further, additional components not described herein may be included in alternative embodiments The functionality of the local media device 102, here a set top box, is now broadly described. A media content provider provides program content that is received in one or more multiple media content streams 142 multiplexed together in one or more transport channels. The transport channels with the media content streams 142 are communicated to the local media device 102 from the exemplary media content provider 138 and are received by the media content stream interface 110. One or more tuners 210 in the media content stream interface 110 selectively tune to one of the media content streams 142 in accordance with instructions received from the processor system 108. The processor system 108, executing the media device logic 116 and based upon a request for a particular media content event of interest specified by the user, parses out media content associated with a media content event of interest. The media content event of interest is then assembled into a stream of video and/or audio information which may be stored by the program buffer 202 such that the media content event can be streamed out to the media presentation device 170 via the presentation device interface 206. Alternatively, or additionally, the parsed out program content may be saved into the DVR 204 for later presentation. The DVR 204 may be directly provided in, locally connected to, or remotely connected to, the local media device 102.

The above processes performed by the local media device 102 are generally implemented by the processor system 106 while executing the media device logic 116. Thus, the local media device 102 may perform a variety of functions related to the processing of the media content stream 142 and processing operating instructions received from a remote control 212. The user, actuating one or more of the controllers 214 on the remote control 212, causes the remote control 212 to transmit a wireless signal 216 that is received by the remote interface 208. The wireless signal 216 may be an infrared (IR) signal and/or a radio frequency (RF) signal.

In an exemplary embodiment, the parental control logic 118 may be downloaded as a discrete application or the like into the local media device 102. Accordingly, a legacy media device may be reconfigured as an embodiment of a local media device 102 that will perform the parental control setting synchronization with the mobile media device 104.

In an exemplary embodiment, the parental control (PC) application (AP) logic 134 may be configured as a discrete downloadable application, or AP. Accordingly, a legacy mobile media device may be reconfigured as an embodiment of a mobile media device 104 that will perform the parental control setting synchronization with the mobile media device 104.

Further, the parental control (PC) application (AP) logic 134 may also include logic that is configured to receive a proprietary media content stream 142 and/or a proprietary media content event from the local media device 102. For example, the media content stream 142 and/or the particular media content event may be subject to media access rights such that a legacy mobile media device is not able to receive, present or otherwise process a media content stream 142 and/or the particular media content event communicated from the local media device 102. As another example, the media content stream 142 and/or the particular media content event communicated from the local media device 102 may be encrypted and/or provided in a native language format that cannot be received, presented or otherwise processed by a legacy mobile media device. When the proprietary parental control (PC) application (AP) logic 134 is downloaded, the mobile media device 104 may then receive, present or otherwise process a media content stream 142 and/or the particular media content event communicated from the local media device 102. In some embodiments, a separate AP may be downloaded that that configures the mobile media device 104 to receive, present or otherwise process a media content stream 142 and/or the particular media content event communicated from the local media device 102.

Embodiments of the parental control setting communication system 100 may configure the mobile media device 104 to operate based on the most restrictive parental control setting information that is received either from a particular local media device 102 and that is set by the user of the mobile media device 104. For example, but not limited to, a restricted media content event with a "PG" rating may be received from a local media device 102 that has its current parental control setting information configured to restrict access to "R" or above rated media content events. After completion of the parental control setting synchronization between the local media device 102 and the mobile media device 104, the "PG" rated media content event would not be restricted by the mobile media device 104 based on the received current parental control setting information.

However, the mobile media device 104 has its own user defined parental control setting information that restricts access to only "G" rated media content events. For example, the user may provide user defined parental control settings via the user interface 106 on the mobile media device 104. Here, the current parental control setting information of the mobile media device 104 is a more restrictive limitation that the parental control setting information received from the local media device 102. Accordingly, the mobile media device 104 would prevent presentation of the received "PG" rated media content event based on the user defined parental control settings.

As another example, the parental control setting synchronization may cause the local media device 102 to operate in accordance with the parental control setting information received from the local media device 102 to restrict access to any "PG" or above media content stream 142 and/or media content event. In some instances, the mobile media device 104 may receive an "R" rated media content event from another source, such as the remote content source 166 or the content device 168. The more restrictive "PG" limitation of enforced at local media device 102 (in accordance with the parental control setting information received from the local media device 102) would prevent presentation of the received "R" rated media content event.

As yet another example, the parental control setting synchronization may cause a first local media device 102 to set the parental control setting information to restrict access to "R" or above based on the current parental control setting information of the first local media device 102. At a later time, a second parental control setting synchronization may occur between the mobile media device 104 and a second local media device 102 that sets second parental control setting information to restrict access to "PG" or above based on the current parental control setting information of the second local media device 102. If the mobile media device 104 receives an "R" rated media content event from another source, such as the remote content source 166 or the content device 168, the more restrictive "PG" limitation of the second local media device 102 would prevent presentation of the received "R" rated media content event.

Some embodiments of the local media device 102 may be configured to initiate parental control setting synchronization with a selected mobile media device 104. For example, the local media device 102 may have stored an identifier of a particular mobile media device 104, such as one in possession of their child. The local media device 102 may be configured to establish a communication link 164 to the selected mobile media device 104 such that the parental control setting information is pushed to the mobile media device 104. The parental control setting information may be the same that is currently in effect at the local media device 102. Alternatively, different parental control setting information may be pushed to the mobile media device 104. For example, the local media device 102 may be configured to restrict access to "R" or above rated media content events. However, the parents may configure the mobile media device 104 to restrict access to "PG" or above rated media content events.

In some embodiments, revised parental control setting information is pushed to the mobile media device 104 whenever the parental control settings are revised at the local media device 102. For example, but not limited to, the parents may leave for a short period of time, such as when going out to dinner or the like. The parents may reset the local media device 102 to restrict access to "PG" or above rated media content events while they are absent. All other mobile media devices 104 may be then reconfigured with the revised parental control setting information. The re-configuration of the mobile media devices 104 may be automatic in some embodiments. Alternatively, the parents may specify which particular mobile media devices 104 are to be reconfigured with the revised parental control setting information.

In some situations, an otherwise restricted media content stream 142 and/or the restricted media content event may be stored by the mobile media device 104. At some later time, a subsequent parental control resynchronization may occur with less restrictive parental control setting information. However, some embodiments may be configured to associate the previous, and more restrictive, parental control setting information in effect at the time that the restricted media content stream 142 and/or the restricted media content event was received and stored by the mobile media device 104. Accordingly, even if the parental control setting information is revised at the mobile media device 104 to be less restrictive, the previously received and more current parental control setting information is applied to the stored restricted media content stream 142 and/or the stored restricted media content event.

In some situations, an otherwise restricted media content event may be stored by the mobile media device 104. After the communication link 164 is ended, the mobile media device 104 may receive a request to present the stored media content event on the display 126 or a request to communicate the stored media content event to another device. Prior to the presentation and/or communication, the previously stored parental control settings received from the local media device 102 may be enforced with respect to the stored media content event.

In some embodiments, an alternative parental control key may be defined at the mobile media device 104 based on user input via the user interface. Various security schemes may be employed so that the user of the mobile media device 104 is not able to circumvent the intended parental control setting information provided by the local media device 102. For example, but not limited to, a parental control key reset function may be provided wherein a user defined parental control key is stored if the user is able to correctly provide the original parental control key in response to a parental control key access challenge initiated by the request to change the media device parental control key 136. The parental control key received from the local media device is then replaced with the user defined parental control key if the access challenge answer corresponds to the parental control key previously received from the local media device. Then, subsequent access challenges may be answered using the user defined parental control key.

In some embodiments, the otherwise restricted media content event is communicated from the local media device 102 in a format that is suitable for use by the mobile media device 104. For example, the media content event at the local media device 102 may be in a high definition (HD) format that cannot be used by the mobile media device 104. Accordingly, the format of the media content event may be modified at the local media device 102 so that the received media content event is provided in a format that can be used by the mobile media device 104. In the event that the rating of the reformatted media content event is lost or is otherwise corrupted during the reformatting, embodiments of the parental control setting communication system 100 may be configured to extract or otherwise communicate the rating information associated with the reformatted media content event so that the intended parental control settings can be enforced at the mobile media device 104.

In some embodiments, the format of the intended parental control setting information format and/or the rating information format of the local media device 102 may be different than the parental control setting information format and/or rating information format that is used by the mobile media device 104. For example, the local media device 102 may be configured to operate using a rating system commonly used in the United States, whereas the mobile media device 104 may be a model that is configured to operate using European formats. Accordingly, the local media device 102 is configured to reformat the intended parental control setting information and/or the rating information into the format used by the mobile media device 104 so that the intended parental control settings may be enforced. Alternatively, or additionally, the mobile media device 104 may be configured to reformat, or at least apply, the intended parental control setting information and/or the rating information received from the local media device 102 into a format that is used by the mobile media device 104.

It should be emphasized that the above-described embodiments of the parental control setting communication system 100 are merely possible examples of implementations of the invention. Many variations and modifications may be made to the above-described embodiments. All such modifications and variations are intended to be included herein within the scope of this disclosure and protected by the following claims.

The invention claimed is:

1. A mobile media device, comprising:
   a communication system interface configured to establish a communication link between the mobile media device and a local media device, configured to receive parental control setting information from the local media device, and configured to receive at least one media content event and rating information associated with the received at least one media content event;
   a display configured to present a video portion of the at least one media content event; and a processor system configured to:
- compare the rating information associated with the received at least one media content event with the parental control setting information received from the local media device; and
- prevent access to the at least one media content event by the mobile media device if the rating information associated with the received at least one media content event violates the parental control setting information.

2. The mobile media device of claim 1, wherein the communication system interface is further configured to receive a parental control key from the local media device at the mobile media device, and wherein the processor system is further configured to:
- present an access challenge at the mobile media device if the rating information associated with the received at least one media content event violates the parental control setting information;
- receive an access challenge answer at the mobile media device;
- compare the received access challenge answer with the parental control key received from the local media device;
- allow access to the at least one media content event by the mobile media device if the access challenge answer corresponds to the parental control key; and
- prevent access to the at least one media content event by the mobile media device if the access challenge answer fails to correspond to the parental control key.

3. The mobile media device of claim 1, wherein the communication system interface is further configured to receive a parental control key from the local media device at the mobile media device, and wherein the processor system is further configured to:
- store the parental control setting information and the parental control key in a memory medium of the mobile media device;
- store the at least one media content event in the memory medium of the mobile media device;
- end the communication link between the mobile media device and the local media device;
- receive a request to present the stored at least one media content event after the ending of the communication link;
- present an access challenge at the mobile media device in response to receiving the request to present the stored at least one media content event at least when the rating information associated with the received at least one media content event violates the parental control setting information;
- receive an access challenge answer at the mobile media device in response to presenting the access challenge;
- compare the received access challenge answer with the stored parental control key;
- allow access to the at least one media content event by the mobile media device if the access challenge answer corresponds to the parental control key; and
- prevent access to the at least one media content event by the mobile media device if the access challenge answer fails to correspond to the parental control key.

4. The mobile media device of claim 1, wherein the mobile media device prevents access to the at least one media content event by the mobile media device if the rating information associated with the received at least one media content event violates the parental control setting information by preventing presentation of the at least one media content event by the mobile media device.

5. The mobile media device of claim 1, wherein the processor system is further configured to store the at least one media content event in a memory of the mobile media device, and wherein the mobile media device prevents access to the at least one media content event by the mobile media device if the rating information associated with the received at least one media content event violates the parental control setting information by preventing communication of the stored at least one media content event to another media device.

6. The mobile media device of claim 1, wherein the processor system is further configured to store the at least one media content event in a memory of the mobile media device, and wherein the mobile media device prevents access to the at least one media content event by the mobile media device if the rating information associated with the received at least one media content event violates the parental control setting information by preventing communication of the stored at least one media content event to a memory communicatively coupled to the media device.

7. The mobile media device of claim 1, wherein the mobile media device prevents access to the at least one media content event by the mobile media device if the rating information associated with the received at least one media content event violates the parental control setting information by scrambling the at least one media content event received by the mobile media device, and by storing the scrambled at least one media content event in a memory of the mobile media device.

8. The mobile media device of claim 1, wherein the mobile media device prevents access to the at least one media content event by the mobile media device if the rating information associated with the received at least one media content event violates the parental control setting information by ending the communication link between the mobile media device and the local media device when the rating information associated with the received at least one media content event violates the parental control setting information.

9. The mobile media device of claim 1, wherein the mobile media device prevents access to the at least one media content event by the mobile media device if the rating information associated with the received at least one media content event violates the parental control setting information by disabling the display of the mobile media device that is presenting the received at least one media content event.

10. The mobile media device of claim 1, wherein the communication system interface is further configured to:
- establish another communication link between the mobile media device and at least one of another local media device and a remote content source; and
- receive the at least one media content event and the rating information associated with the received at least one media content event from one of the other local media device and the remote content source.

11. The mobile media device of claim 1, wherein the processor system is further configured to:
- receive user defined parental control setting information at the mobile media device;
- compare the rating information associated with the received at least one media content event with the parental control setting information and the user defined parental control setting information; and
- prevent access to the at least one media content event if the rating information associated with the received at least one media content event violates either the parental control setting information or the user defined parental control setting information.

12. The mobile media device of claim 1, wherein the processor system is further configured to:
   identify a channel that is providing the at least one media content event; and
   compare an identifier of the channel that is providing the at least one media content event with restricted channels, wherein access to the at least one media content event by the mobile media device is prevented if the identifier of the channel that is providing the at least one media content event is one of the restricted channels.

13. The mobile media device of claim 1, wherein the processor system is further configured to:
   identify an identity of the local media device;
   determine if parental controls are enforced at the identified local media device; and
   request the parental control setting information from the local media device in response to determining that the parental controls are enforced at the local media device.

14. The mobile media device of claim 1, wherein the established communication link is a first communication link between a first mobile media device and the local media device, wherein the parental control setting information is first parental control setting information, and wherein the communication system interface is further configured to:
   establish a second communication link between the mobile media device and a second local media device; and
   receive second parental control setting information from the second local media device, and
   wherein the processor system is further configured to:
      compare the rating information associated with the received at least one media content event with the first parental control setting information and the second parental control setting information; and
      prevent access to the at least one media content event by the mobile media device if the rating information associated with the received at least one media content event violates either the first parental control setting information or the second parental control setting information.

15. The mobile media device of claim 1, wherein the parental control setting information is first parental control setting information, and wherein the processor system is further configured to:
   receive user defined second parental control setting information at the mobile media device;
   compare the rating information associated with the received at least one media content event with the first parental control setting information and the user defined second parental control setting information; and
   prevent access to the at least one media content event if the rating information associated with the received at least one media content event violates either the first parental control setting information or the user defined second parental control setting information.

16. A mobile media device that enforces parental controls, comprising:
   a communication system interface configured to establish at least one communication link between the mobile media device and a first local media device and a second local media device, configured to receive first parental control setting information from the first local media device, configured to receive second parental control setting information from the second local media device, and configured to receive at least one media content event and rating information associated with the received at least one media content event;
   a display configured to present a video portion of the at least one media content event; and
   a processor system configured to:
      compare, at the mobile media device, the rating information associated with the received at least one media content event with the first parental control setting information received from the first local media device and with the second parental control setting information received from the second local media device; and
      prevent access to the at least one media content event by the mobile media device if the rating information associated with the received at least one media content event violates either the first parental control setting information or the second parental control setting information.

17. The mobile media device of claim 16, wherein the mobile media device prevents access to the at least one media content event by the mobile media device if the rating information associated with the received at least one media content event violates at least one of the first parental control setting information and the second parental control setting information by performing at least one selected from a group consisting of:
   preventing presentation of the at least one media content event by the mobile media device;
   preventing communication of the at least one media content event to another media device;
   preventing communication of the at least one media content event to a memory communicatively coupled to the mobile media device;
   scrambling the at least one media content event received by the mobile media device;
   ending the at least one communication link between the mobile media device and at least one of the first local media device and the second local media device when the rating information associated with the received at least one media content event violates at least one of the first parental control setting information and the second parental control setting information; and
   disabling the display of the mobile media device that is presenting the received at least one media content event.

18. A mobile media device that enforces parental controls, wherein the mobile media device is configured to communicatively couple to a local media device, the comprising:
   a communication system interface configured to establish a communication link between the mobile media device and the local media device, configured to receive parental control setting information from the local media device, and configured to receive at least one media content event and rating information associated with the received at least one media content event;
   a display configured to present a video portion of the at least one media content event; and
   a processor system configured to:
      compare the parental control setting information with the rating information associated with the at least one media content event;
      present an access challenge when the rating information associated with the at least one media content event violates the parental control setting information;
      allow access to the at least one media content event by the mobile media device if an access challenge answer corresponds to a parental control key; and prevent access to the at least one media content event by the mobile media device if the access challenge answer fails to correspond to the parental control key, wherein the communicating occurs in response to a change in at least one of the parental control setting information and the parental control key at one of a first local media device or a second local media device prior to the at least one media content event being received by the mobile media device.

19. The mobile media device of claim 18, wherein the processor system is further configured to:
   establish another communication link between the mobile media device and at least one of a third local media device and a remote content source; and
   receive the at least one media content event and the rating information associated with the received at least one media content event from one of the third local media device and the remote content source.

20. The mobile media device of claim 18, wherein the mobile media device prevents access to the at least one media content event by the mobile media device if the rating information associated with the received at least one media content event violates the parental control setting information by performing at least one selected from a group consisting of:
   preventing presentation of the at least one media content event by the mobile media device;
   preventing communication of the at least one media content event to another media device;
   preventing communication of the at least one media content event to a memory communicatively coupled to the mobile media device;
   scrambling the at least one media content event received by the mobile media device;
   ending the communication link between the mobile media device and the local media device when the rating information associated with the received at least one media content event violates the parental control setting information; and
   disabling the display of the mobile media device that is presenting the received at least one media content event.

* * * * *